United States Patent [19]
Harms, Jr. et al.
[11] 3,886,328
[45] May 27, 1975

[54] ELECTRO-OPTICAL READER

[75] Inventors: A. D. Harms, Jr., Winona; Robert B. Hemphill, Dallas; Chris A. Balthrop, Bedford; Harley D. Peter, Dallas, all of Tex.

[73] Assignee: E-Systems Inc., Dallas, Tex.

[22] Filed: June 1, 1973

[21] Appl. No.: 366,190

[52] U.S. Cl. .......... 235/61.11 E; 250/555; 250/569; 340/173 LT

[51] Int. Cl. ...... G06k 7/10; G08c 9/06; G11c 11/42

[58] Field of Search ...... 235/61.11 E; 250/568, 569, 250/570, 213, 227, 555, 566; 340/146.3 D, 146.3 F, 146.3 J, 146.3 AH, 173 LM, 173 LT; 178/5.4 M, 7.5, 6

[56] References Cited

UNITED STATES PATENTS

| | | | |
|---|---|---|---|
| 3,600,556 | 8/1971 | Acker | 235/61.11 E |
| 3,644,714 | 2/1972 | Phillips | 235/61.11 E |
| 3,663,813 | 5/1972 | Shaw | 235/61.11 E |
| 3,684,867 | 8/1972 | Acker | 235/61.11 E |

*Primary Examiner*—Daryl W. Cook
*Attorney, Agent, or Firm*—Robert V. Wilder

[57] ABSTRACT

Bar codes imprinted or otherwise applied to an object are read and decoded by focusing light reflected from the code by means of an objective lens to an image intensifier tube. Light energy reflected from the code impinges on the photo cathode of the image intensifier tube thereby causing an electron beam to generate a display on a phosphor screen with the electron beam deflected to center the code image on the phosphor screen. A fiber optic array channels light from the phosphor screen to an array of photo sensors each having an output coupled to an amplifier circuit. Output voltages from the amplifier array are simultaneously coupled to acquisition, tracking and reading logic. Initially, upon detecting the presence of a code on an object the acquisition and tracking logic responds thereto to produce deflection voltages to the image intensifier tube to provide centering on the phosphor screen. Once centered, outputs from the amplifier array are coupled to reading logic to generate an output waveform representative of the bar coded data.

27 Claims, 11 Drawing Figures

ELECTRO-OPTICAL READER

This invention relates to electro-optical readers and more particularly to bar code readers wherein the code is electronically scanned first for determining the location thereof and then for reading and decoding.

There has recently developed a need to quickly and accurately identify an object for purposes of location, sortation and routing. For example, with the ever increasing volume of letter mail there is a need for rapid and accurate mechanical identification and sorting to insure rapid and accurate mail delivery. Document identification and sortation is also becoming a significant problem in many industries such as banking and insurance wherein a significant volume of paper work must be processed daily on a reliable basis. The quick and accurate interpretation of data manifestations has also become important in fields where returnable media are utilized, such as the moving stock of railroads. Also, in the warehousing industry there is developing a need to quickly and accurately identify the location of stored items for retrieval thereof.

Commonly, the objects mentioned above are encoded in an optically-sensible bar code that requires appropriate code recognition equipment for the interpretation thereof. Such recognition equipment characteristically scans across a first dimension of a document and in each scanning position interprets indicia at a number of vertical (row) positions. Many systems heretofore provided for bar code recognition required a critical vertical alignment and registration of the document since any misalignment was readily and erroneously interpreted as encoded data. Prior art bar code recognition systems have approached the registration problem with devices which either move the detection means or move the record document; either being cumbersome and slow. For instance, it has been commonly necessary to detect a "reference position" along the vertical dimension of the object to move the object into a scanning position. Other prior art bar code recognition systems, upon sensing a reference position, physically positioned the detection means so as to fully view the encoded data. It will be easily understandable that the processing time and equipment necessary for either of these systems is considerable and cost tends to be prohibitive. Another solution to the problem was the use of large arrays of detection means to insure that at least one of such detection means received energy from the encoded data. This in effect required a multiplication of a single system with the attendant complexity and cost disadvantages.

As mentioned previously, industries requiring the handling of a large volume of documents are becoming increasingly more dependent on automatic sortation systems responding to coded data. The encoded data may be printed on the document in ordinary ink and in that case the scanning device must be sensitive to light waves in the visible region, but the documents may also be printed in ink emitting ultraviolet radiation and in such a case the scanning device must be sensitive to ultraviolet wavelength radiation. The documents are processed in equipment that imparts a straight line motion to the document, but the transporting equipment may also press the document either mechanically or pneumatically against a cylinder rotating around its axis, this axis being parallel to the vertical orientation of the data.

Various systems are available for applying coded data to a document such as standard bar code printers and ink jet printers. The quality of such printing varies considerably such that in the worst case and under high magnification the coded data appears like a random splattering of ink droplets. To accurately and reliably read and decode such information requires a system that can recognize general patterns of coded data and not be restricted to clear sharply defined outlines.

In applications wherein coded information is utilized to sort returnable media and in the warehousing industry, the data manifestations are subject to rough usage and parts thereof are distorted if not destroyed. The overall data processing system, however, including the identification portion, must operate considerably more reliably than humans selected to perform the function. In applications where the encoded returnable media is in motion, the code identifying system must be capable of identifying objects traveling at speeds ranging to 60 miles per hour or more. It is also necessary that the code detection system operate under extreme environmental conditions including wide ranges of temperature and may be subject to vibration and shock. The operating tolerances of the bar code recognition system must provide accurate readouts in spite of the normal variation in height, side sway and inclination of the moving object.

A feature of the present invention is to provide a new and improved, inexpensive electro-optical code reading system that operates effectively over a wide range of code quality for automatic identification of encoded documents and other objects. Another feature of the present invention is to provide a new and improved electro-optical bar code information responsive system that responds to coded information where both the horizontal and vertical position is unknown in a wide viewing area, yet utilizes a fixed position detection means for automatic recognition of coded documents and like objects. Still another feature of the present invention is to provide a new and improved, inexpensive electro-optical bar code information reader utilizing a detection means responsive to coded data on a document or other object wherein the document or object has a skewed tracking direction to change the position of the encoded data within the viewing area of the detection means. Yet another feature of the present invention is to provide a new and improved electro-optical bar code information reading system utilizing detection means with a minimum of sensitivity to noise signals generated by coded information having poor quality.

In one embodiment of the present invention, a recognition system for bar code data carried by an object includes first means for receiving light waves reflected from the encoded data and providing a target reproduction thereof. Associated with this first means is second means for producing a deflection of the light wave energy transmitted from the encoded data to position the target reproduction in a preselected area. Electrical signals are generated by a third means coupled to the first means and responsive to the target reproduction of the encoded data. These electrical signals are received by fourth means that generates a series of electrical pulses representing the object carried bar coded data.

In a more specific embodiment of the invention, a recognition system for bar coded data carried by an object includes first means for receiving light waves reflected from the encoded data to provide a target reproduction thereof. Second means are provided for deflecting the light wave energy transmitted from the encoded data to the first means. A first signal representing areas of the encoded data and a second signal representing the background area are generated by third means coupled to the first means and responsive to the target reproduction of the encoded data. A summation circuit is connected to receive the first signal and the second signal to be combined into a series of voltage pulses representing the encoded data.

Other and further features and advantages of the present invention will be apparent from the following description and claims and are illustrated in the accompanying drawings which, by way of illustration, shows preferred embodiments of the present invention and the principles thereof and what is now considered to be the best modes contemplated for applying these principles.

Referring to the drawings.

Figure 1:
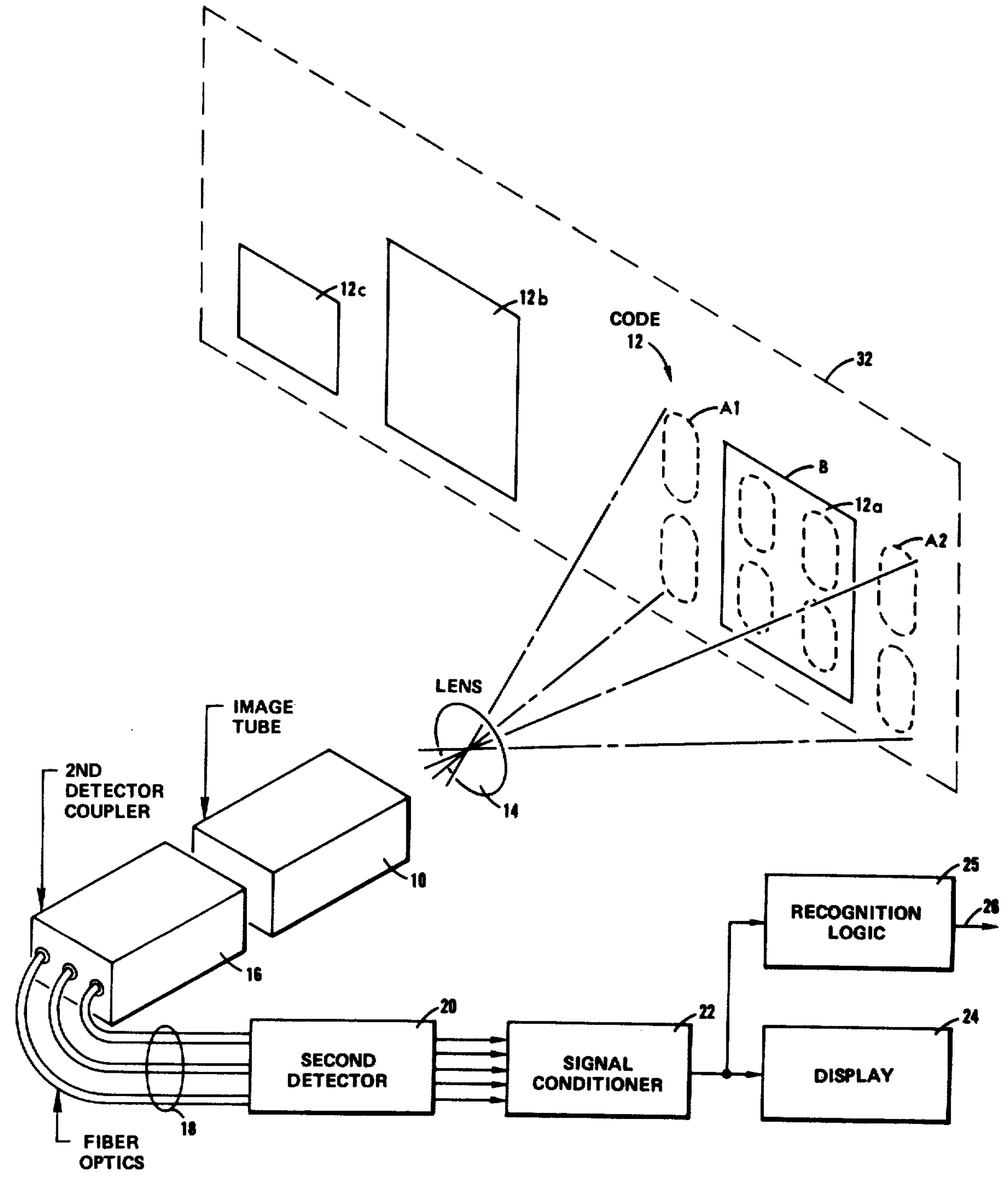
FIG. 1 is a pictorial block diagram of the major components for generating electrical signals representative of a bar code comprising full bar codes and half bar codes.

Referring to FIG. 1, there is shown an electro-optical bar code reader utilizing an image intensifier tube 10 as a sensor to detect both visible and near infrared energy reflected from an object and a code 12 comprising full bar codes 12*a* and 12*b* and a half bar code 12*c* all carried by the object. The image intensifier tube 10 is an electron device which reproduces a picture of the bar code 12 on a phosphor screen, the picture being identical to, and often much brighter than, the original image on the photo cathode positioned in the tube at the point of incoming lightwave energy. All energy intensifier tubes have a photo cathode which emits electrons in the same density pattern as the illumination falling on the incoming surface of the tube. These electrons are accelerated to, and focused on, the phosphor screen by an accelerating voltage and an electromagnetic coil, surrounding the tube. The coil is energized to deflect the electron beam within the tube and to thereby provide a means for accurately positioning the target reproduction on the phosphor screen. The electrons strike and excite the phosphor screen which emits light, thereby reproducing the code impinging on the photo cathode.

In addition to image intensifier tubes, other light responsive detectors having a scanning capability may be utilized to generate a reproduction of the bar code data carried by an object, such as, an image dissector with multiple apertures feeding a photo multiplier.

An objective lens 14 collects the reflected lightwave energy from the code 12 and the background area of the object on which it is printed, and focuses this energy on the photo cathode of the image intensifier tube 10.

Coupled to the image intensifier tube 10 at the phosphor screen end is a coupler 16 for transmitting light emitted from the phosphor screen to a series of fiber optic bundles 18 coupled to a matrix of light responsive sensors 20. Typically, the light responsive sensors are either photo multipliers or photo diodes having a characteristic to generate a signal varying with lightwave energy impinging thereon. Thus, light emitting from the target reproduction of the bar code 12 on the phosphor screen of the image intensifier tube 10 is channeled by means of the fiber optic bundles 18 to a matrix of light responsive sensors 20, each generating a signal coupled to recognition logic 22 that provides a series of recognition pulses to a display 24 and on a line 26 for coupling to sortation equipment or other controls utilizing the recognition pulses.

Depending upon the application of the system of FIG. 1 and the quality of the bar code to be read, single fiber optic strands, either embedded in an epoxy or separated in a bundle of other fiber optic strands, may be used to transmit lightwave energy from the intensifier tube 10 to the light responsive sensors 20. A minimum of three light responsive sensors 20 are required to perform bar code reading of the type illustrated in FIG. 1 by the code 12. For reading codes moving at a high rate of speed past the objective lens 14, multiple fiber optic strands are arranged in a bundle to direct light to a single light responsive sensor 20. Also, the number of light responsive sensors 20 varies both with the quality of the code to be read and the window area in which the code may appear while passing the image intensifier tube 10. In the system to be described, fourteen light responsive sensors 20 are arranged in scanning zones covering the viewing window area in which a code may appear. Each of these sensors 20 responds to light transmitted through a fiber optic bundle 18 comprising multiple strands, each strand having one end optically connected through the coupler 16 to the image intensifier tube 10 and the other end in contact with the light responsive surface of the sensor.

Figure 2:
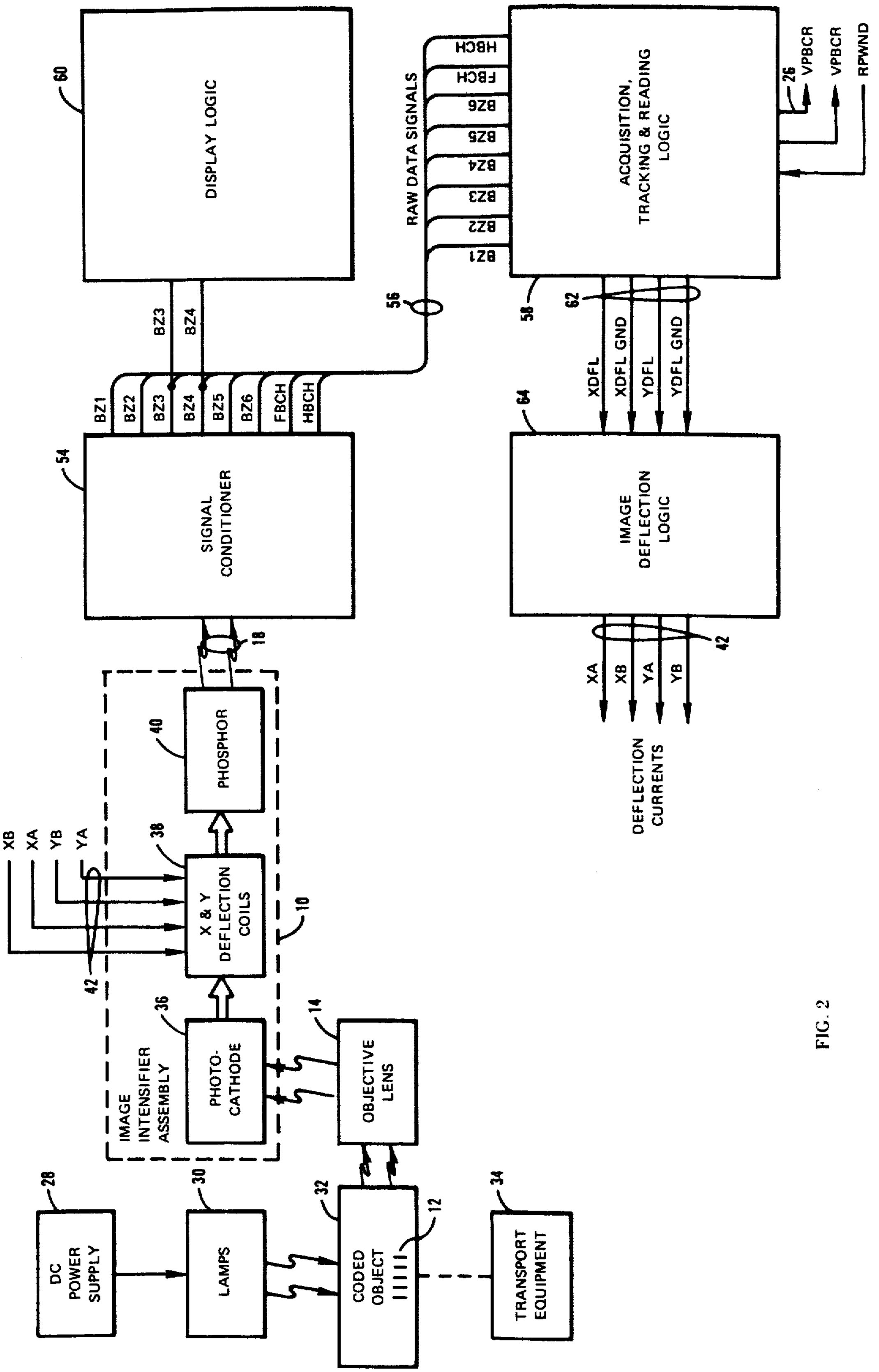
FIG. 2 is a block diagram showing in greater detail the major blocks of FIG. 1 and particularly illustrating in block form a signal conditioner; an acquisition, tracking and reading system, and an image deflection system.

Referring to FIG. 2, there is shown an expanded block diagram of an electro-optical bar code reader including a power supply 28 for energizing an array of lamps 30 for illuminating the window area of an object 32 carrying the bar code 12. Transport equipment 34 imparts a motion to the object 32 past the illuminated area produced by the lamps 30.

Light reflected from the bar code 12 is focused by means of the objective lens 14 on a photo cathode 36 of the image intensifier tube 10. Electrons emitted from the photo cathode 36 are transmitted through deflection coils 38 and impinge on a phosphor screen 40 at the end of the tube 10 opposite from the photo cathode 36. The deflection coils 38 are energized by deflection voltages on lines 42 to deflect the electron beam from the photo cathode 36 in both the X and Y directions. By selective energizing of the deflection coils 38, the bar code 12 may appear anywhere within a scanning window area such that the objective lens 14 focuses the reflected lightwave energy to the photo cathode 36. By varying the deflection voltage to the coils 38, the electron beam is positioned in a desired target area of the phosphor screen 40.

Figure 3:
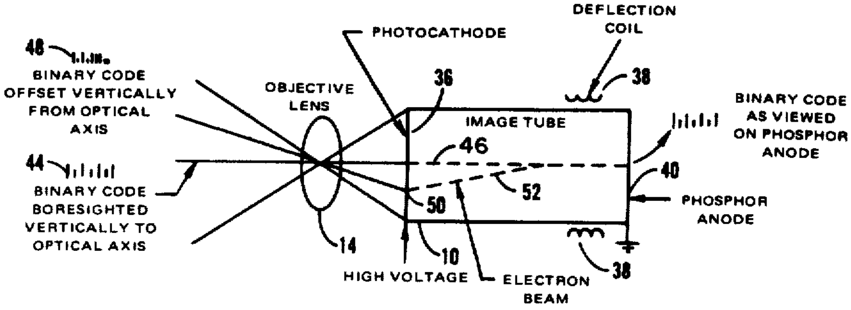
FIG. 3 is a schematic diagram of an image intensifier tube with deflection coils for electronic positioning of a target reproduction of an incoming image.

Referring to FIG. 3, there is schematically illustrated an image intensifier tube 10 with the object lens 14 directing light energy to the photo cathode 36. Assume that a first binary code as at 44 appears on the optical axis of the objective lens 14, then light reflected therefrom will impinge on the photo cathode 36 on the axis of the tube 10. An electron beam 46 emitting from the photo cathode will be directed axially through the tube 10 to impinge on the center of the phosphor screen 40. In this case, the deflection coils 38 remain deenergized and do not influence the path of the electron beam 46. Next, assume that a binary code 48 appears offset from the vertical optical axis of the lens 14. In this case, light reflecting from the code 48 will impinge on the photo cathode 36 at a location 50 offset from the longitudinal axis of the tube 10. By properly energizing the deflection coils 38, an electron beam 52 emitting from the photo cathode 36 at the point 50 will be deflected onto the center of the phosphor screen 40. Thus, by properly energizing the deflection coils 38, the offset binary code 48 is made to appear at a preselected target area on the phosphor screen 40 the same as the boresighted binary code 44.

Returning to FIG. 2, light emitting from the phosphor screen 40 is transmitted through the fiber optic bundles 18 to a signal conditioner network 54 as part of the signal conditioner 22, FIG. 1. The signal conditioner network 54 generates raw data signals transmitted over communication lines 56 to acquisition, tracking and reading logic 58. Data from preselected scanning zones is also transmitted directly from the signal conditioner network 54 to display logic 60 for driving the display 24.

Raw data signals inputed to the logic 58 are directed to logic elements therein for generating deflection control on lines 62 to an image deflection network 64. Signals inputed to the logic 58 are also utilized to generate recognition pulses on the line 26 for control purposes or location as desired. The image deflection network utilizes the deflection control on the lines 62 to adjust deflection currents on lines 42, which are coupled to the deflection coils 38 for positioning the target reproduction of the code 12 on the phosphor screen 40.

Figure 4:
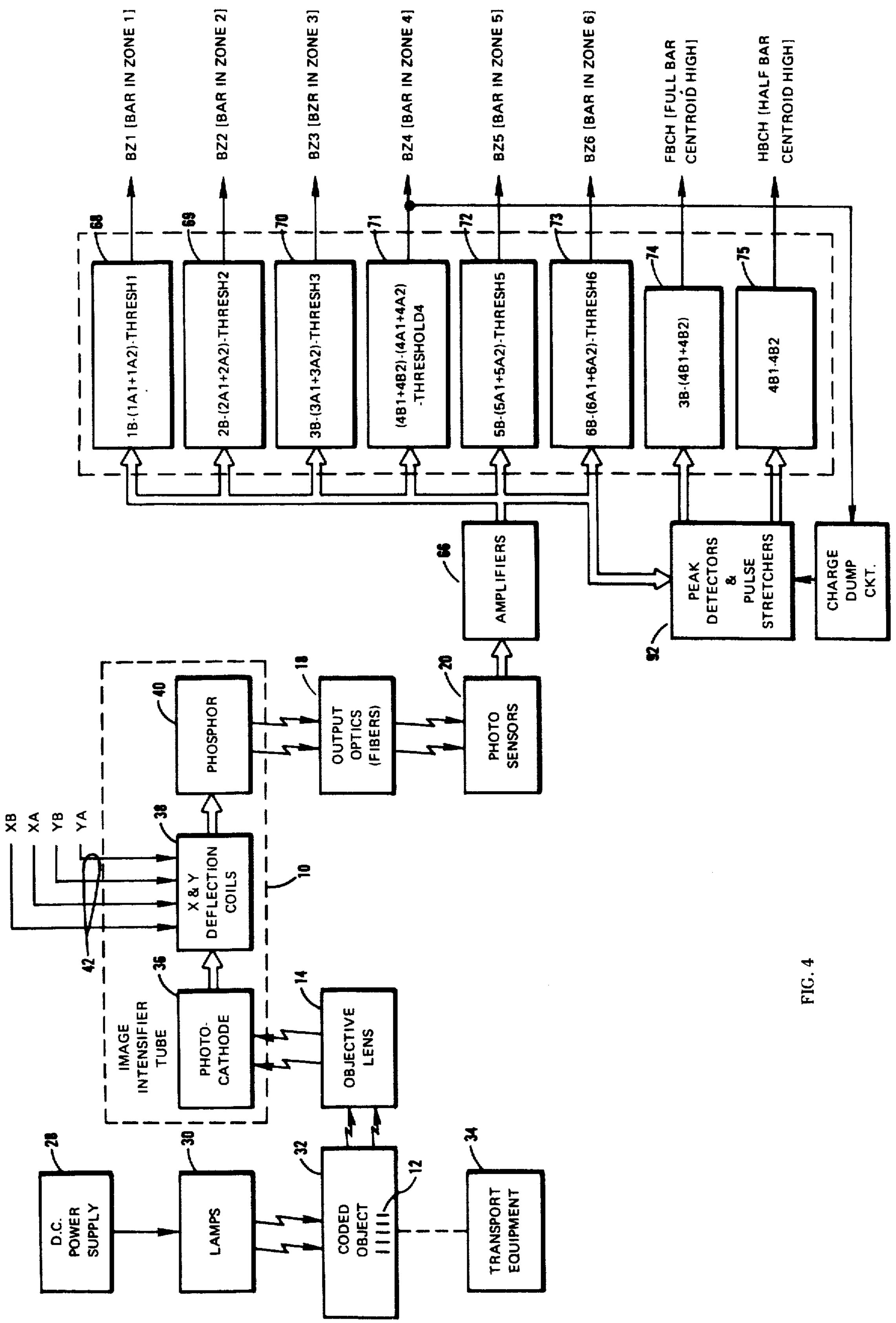
FIG. 4 is a block diagram of the optics and signal conditioner part of the bar code reader of the present invention.

Referring to FIG. 4, there is shown an expanded block diagram of the signal conditioner, network 54 wherein the individual light responsive sensors 20 are coupled to individual amplifiers 66 for amplification of the sensor output to a workable level for application to comparator circuits 68–75, each responsive to light reflected from respective scanning zone of the viewing window area.

Figure 5:
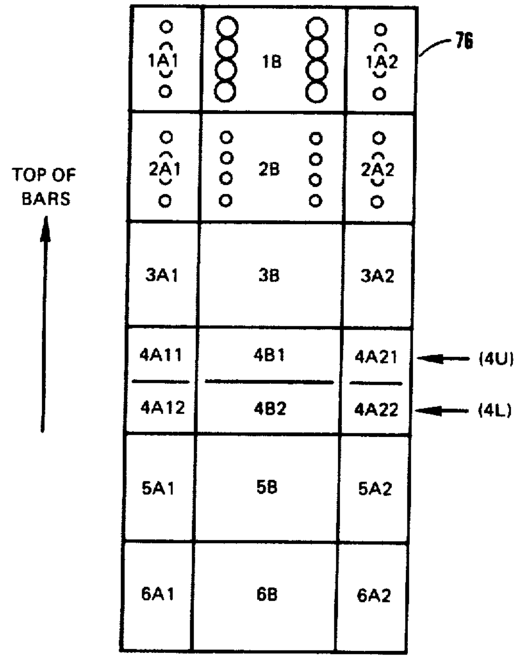
FIG. 5 is an illustration of scanning zones viewed by an image intensifier tube of the system of FIG. 2.

Referring to FIG. 5, there is illustrated a viewing window area 76 comprising six scanning zones for covering the vertical extent of the viewing window. Each vertical scanning zone is divided into a code zone designated in each case by the letter B, with background zones positioned on either side of the code zone. These background zones are designated by A1 and A2. In each of the code zones there are two columns of fiber optic elements, with each column consisting of four elements for a total of eight elements per code zone such as illustrated in the zone 1B. Each of the background zones is made up of a column of four fiber optic elements such that there are a total of ninety-six elements in the viewing window area 76.

Each of the fiber optic elements of the scanning zone, either all eight elements of a code zone or all eight elements of the background zones on either side of a particular code zone, are coupled to their respective comparator circuit 68–75. That is, all the fiber optic elements of the zone 1B are coupled to the comparator 68 along with all the elements of the zones 1A1 and 1A2. Each of the blocks representing the comparator circuits 68–75 are illustrated with a mathematical expression setting forth the fiber optic elements of the zones coupled thereto.

Figure 6:
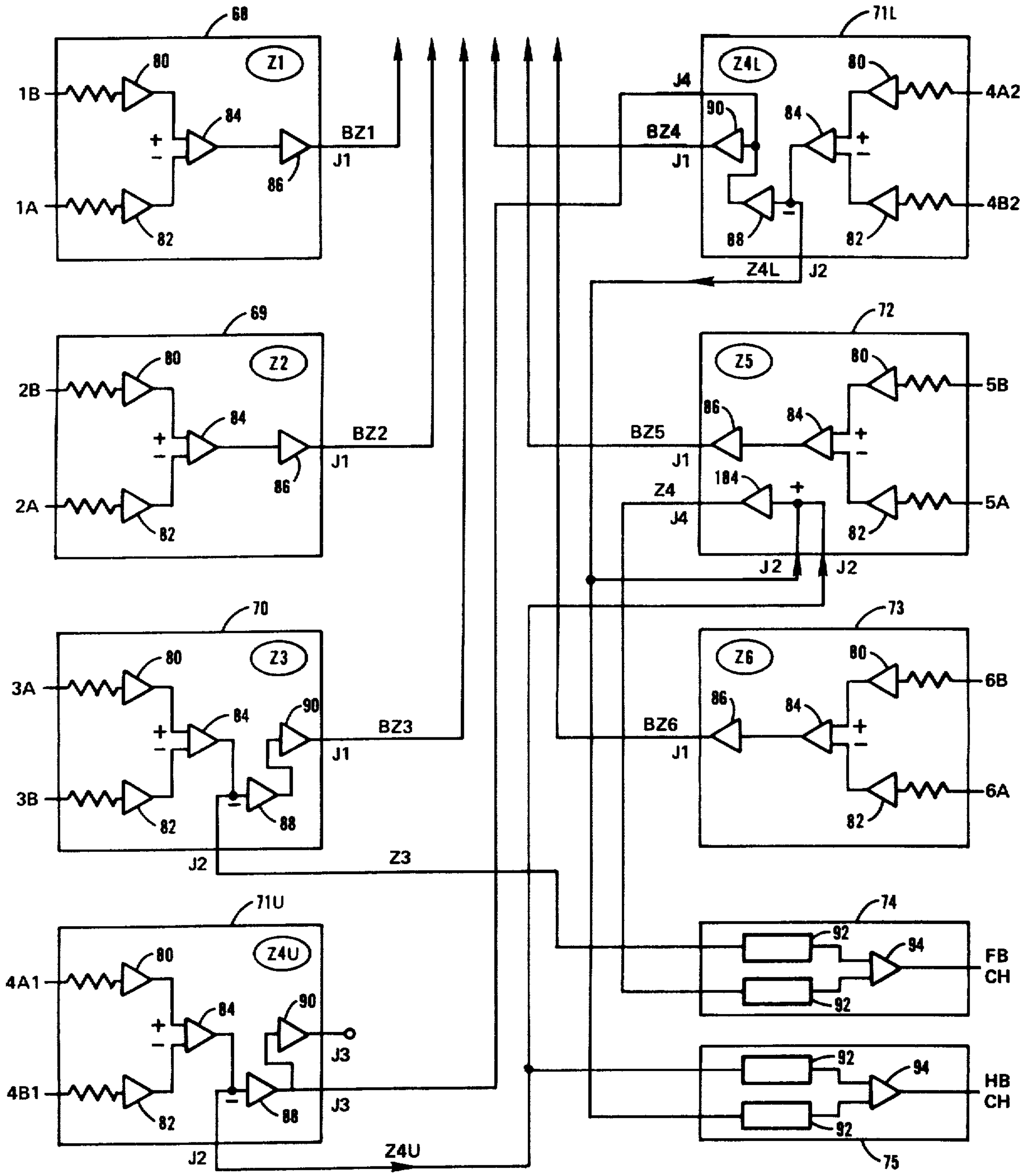
FIG. 6 is a block diagram of the individual comparator circuits for each of the scanning zones of FIG. 5.

Referring to FIG. 6, there is shown a block diagram of each of the comparators 68–75 showing the scanning zones connected to each. With reference to the scanning zone 4 of the window area 76, this is the primary reading zone and is divided into an upper and lower section designated 4A11, 4B1, 4A21 and 4A12, 4B2, 4A22, respectively. In FIG. 6 the comparator 71U receives light energy from sections 4A11, 4B1 and 4A21, while the comparator 71L receives light energy from the sections 4A12, 4B2 and 4A22.

Each of the comparator networks 68–73 includes an amplifier 80 responsive to one array of eight light responsive sensors 20 and an amplifier 82 responsive to another set of eight light responsive sensors. Each of the amplifiers 80 and 82 has an output tied to one input of a differential amplifier 84. In the comparators 68, 69, 72 and 73 the output of the amplifier 84 is further amplified in an amplifier 86. In the comparators 70, 71U and 71L the output of the amplifier 84 is tied to an amplifier 88, the output of which is further amplified in an amplifier 90.

The output of the amplifiers 86, in the comparators 68, 69, 72 and 73, comprises the raw data signals coupled to the acquisition, tracking and reading logic 58. In the comparator 71L the output of the amplifier 90 comprises the raw data signals coupled to the logic 58 for zone 4. For the comparators 74 and 75, each includes peak detectors and pulse generating circuits 92 having outputs tied to inputs of an amplifier 94. The output of the amplifier 94 for the comparator 74 is a full bar centroid high (FBCH) signal, and the output of the amplifier 94 from the comparator 75 is a half bar centroid high (HBCH) signal; both centroid signals are coupled to the logic 58.

Figure 7:
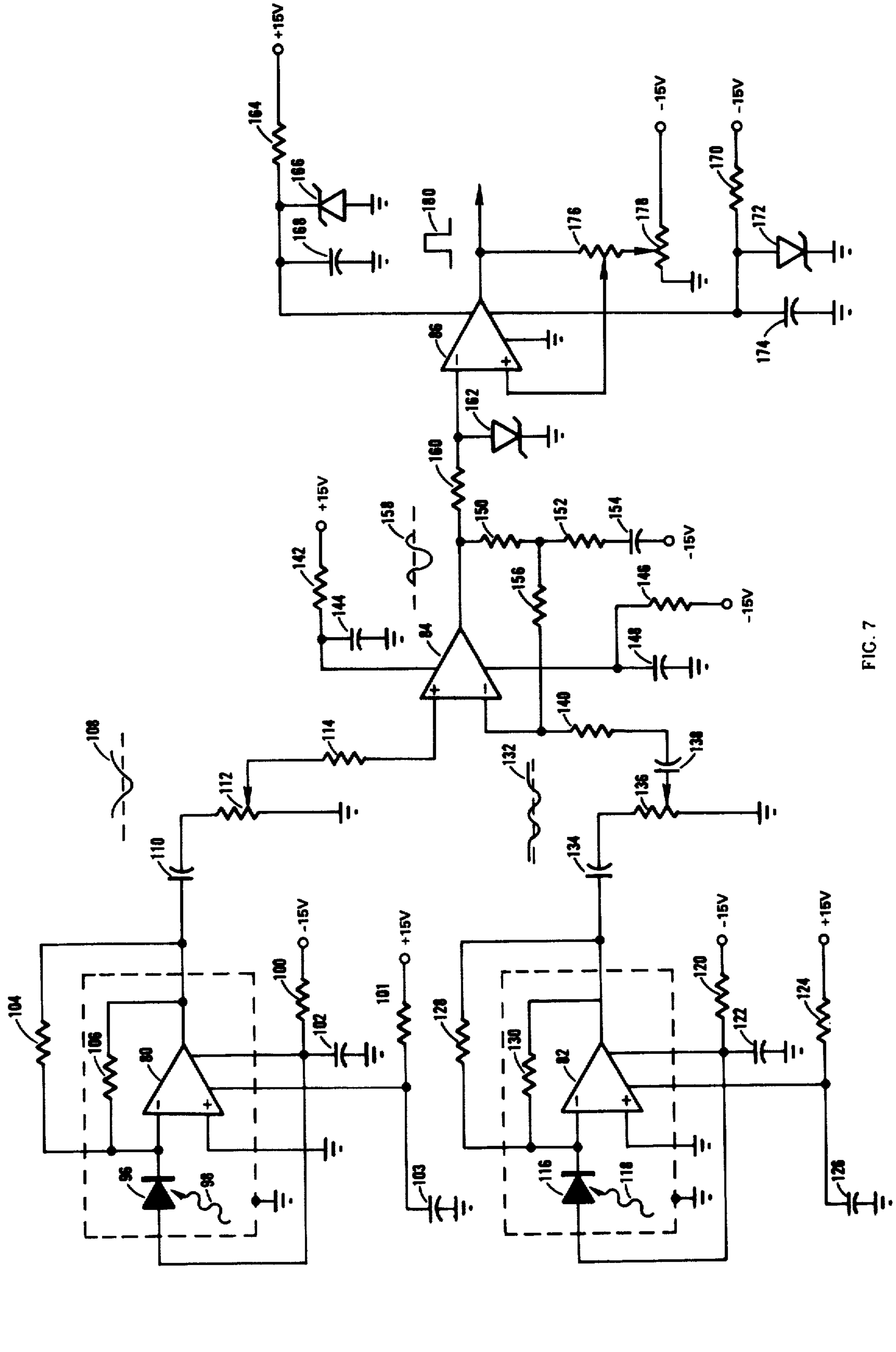
FIG. 7 is a schematic of an amplifier-comparator bar code reader.

Referring to FIG. 7, there is shown a schematic of the comparator circuits 68, 69 and 73 including the amplifiers 80, 82, 84 and 86. Lightwave energy transmitted by the fiber optics from one of the B zones is directed to a photo diode 96 as indicated by the waveline 98. The cathode of the diode 96 is tied to the negative input of the amplifier 80 having a positive input terminal coupled to ground. Typically, the amplifiers 80 and 82 are Bell and Howell Models 509-50. A negative DC voltage is coupled to the amplifier 80 and to the anode of the diode 96 both through a resistor 100 which is also tied to ground through a capacitor 102. The output terminal of the amplifier 80 connects to a feedback loop including resistors 104 and 106 interconnected to the negative input terminal of the amplifier.

An output signal from the amplifier 80 varies in accordance with a curve 108 and is coupled through a capacitor 110 to a gain potentiometer 112. The wiper arm of the potentiometer 112 is connected through a resistor 114 to the positive input terminal of the differential amplifier 84. Typically, the amplifier 84 is available from National Electronics, Model No. LM318.

Light transmitted by the fiber optics of one of the A1 and A2 zones impinges on a photo diode 116 as indicated by waveline 118. The cathode electrode of the diode 116 is connected to the negative input terminal of the amplifier 82 having a positive input terminal coupled to ground. A negative DC supply is tied to the amplifier 82 and the anode electrode of the diode 116 both through a resistor 120 which also connects to ground through a capacitor 122. A positive DC energizing voltage is also supplied to the amplifier 82 through a resistor 124 also connected to ground through a capacitor 126.

The output terminal of the amplifier 82 connects to a feedback loop including resistors 128 and 130 interconnected to the negative input terminal of the amplifier. An output voltage from the amplifier 82 varies as shown by the curve 132 and is coupled through a capacitor 134 to a gain potentiometer 136. The wiper arm of the gain potentiometer 136 is coupled to the negative input terminal of the amplifier 84 through a coupling capacitor 138 and a resistor 140.

A positive DC voltage is applied to the amplifier 84 through a resistor 142 and a capacitor 144, and a negative DC voltage is coupled to the amplifier 84 through a resistor 146 and a capacitor 148. The output terminal of the amplifier 84 is connected to a feedback loop including a divider network of resistors 150 and 152 in series with a capacitor 154. A feedback resistor 156 is interconnected between the junction of the resistors 150 and 152 and the negative input terminal of the amplifier.

An output from the amplifier 84 varies with the difference between the outputs of the amplifiers 80 and 82 and has a waveform as shown by the curve 158. This output voltage is applied through a resistor 160 to the negative input terminal of an amplifier 86. A Zener diode 162, also coupled to the negative input terminal of the amplifier 86, clamps the input of the amplifier 86 to a preselected level. A positive DC voltage is applied to the amplifier 86 through a resistor 164 also connected to a Zener diode 166 in parallel with a capacitor 168 regulating the voltage to a preset level. Similarly, a negative DC voltage is applied to the amplifier 86 through a resistor 170 also connected to a Zener diode 172 in parallel with a capacitor 174 maintaining the DC voltage at a preselected level.

The output terminal of the amplifier 86 is coupled to a hysteresis and threshold adjustment network comprising a potentiometer 176 and a potentiometer 178, with the wiper arm of the former coupled to the positive input terminal of the amplifier. The potentiometer 178 is connected to the negative terminal of a DC supply and to ground and has the wiper arm tied to the potentiometer 176. The output voltage of the amplifier 86 is a series of pulses as illustrated by the curve 180, with each pulse representing a full bar in a code sequence. Thus, as a bar code enters either zone 1B, 2B or 6B, a pulse 180 is generated.

By connecting the background zones A1 and A2 in a differential configuration with one of the code zones B, the system achieves improved noise rejection. The differential configuration of the amplifier 84 provides an output related to the relative difference between light impinging on the diode 96 with respect to light impinging on the diode 116. With the diode 116 responsive to background reflected light and the diode 96 responsive to a bar code reflected light, imperfections in the bar code tend to be rejected by the system. Thus, improved reliability in code detection and reading is possible.

Figure 8:
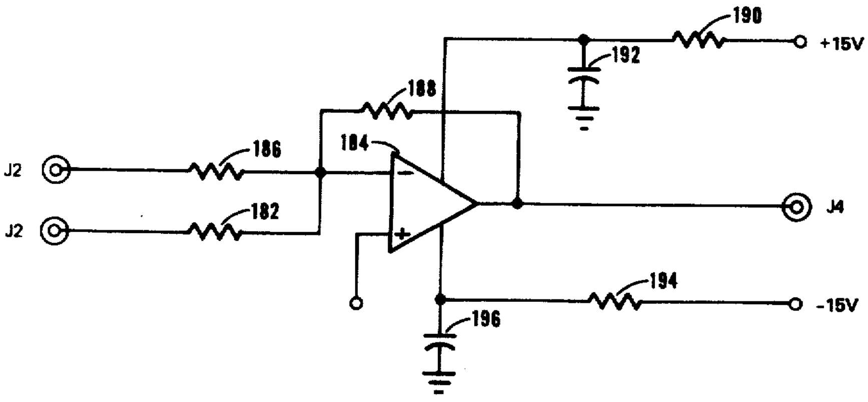
FIG. 8 is a schematic of an amplifier which is an addition to the amplifier-comparator of FIG. 7 and outputs the clock from scanning zone 4 of FIG. 6.

Referring to FIG. 8, there is shown an amplifier circuit which is in addition to the circuit of FIG. 7 and when so combined represents a detailed schematic of the network 72, FIG. 6, for zone 5 of the window area 76. A voltage signal from the comparator circuit 71L is applied to an input resistor 182 tied to the negative input terminal of an amplifier 184, and a voltage signal from the comparator circuit 71U is applied through a resistor 186 to the same input terminal of the amplifier 184. Thus, voltages from the zones 4U and 4L are summed in the resistor network 182 and 186 and amplified in the amplifier 184.

Connected around the amplifier 184 to the negative input terminal is a feedback loop including a resistor 188. A positive DC voltage is connected to the amplifier 184 through a resistor 190 which is also connected to ground through a capacitor 192. A negative DC voltage is connected to the amplifier 184 through a resistor 194 having a connection to ground through a capacitor 196. Typically, the amplifier 184 is available from Fairchild Manufacturing Company, Model No. μA710. An output from the amplifier 184 is connected to the circuit 92 of comparator 74, FIG. 6, as part of the system for generating the full bar centroid high signal.

Figure 9:
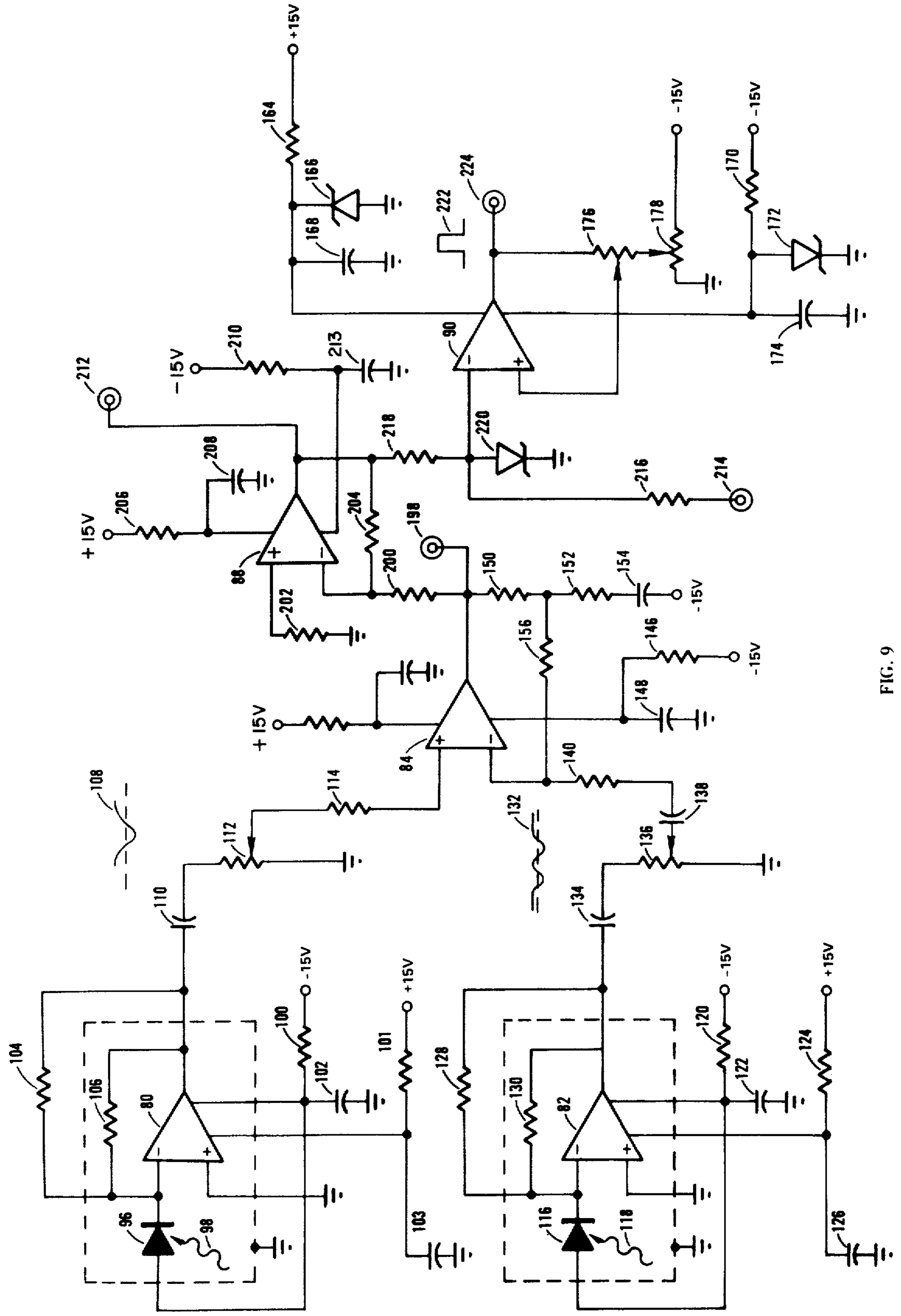
FIG. 9 is a schematic diagram of an amplifier-comparator bar code reader for scanning zones 3, 4U and 4L.

Referring to FIG. 9, there is shown a full schematic of the comparator circuits 70, 71U and 71L for scanning zones 3 and 4 of the window area 76, FIG. 5. The input section of the circuit of FIG. 9 is similar to the input section of the circuit of FIG. 7, that is, circuitry associated with the amplifiers 80, 82 and 84 is the same in FIGS. 7 and 9. This part of the circuit of FIG. 9 will not be detailed again.

Light transmitted from the code zones 3B, 4B1 or 4B2 impinges on the photo diode 116 as illustrated by the waveline 118 while light transmitted by the fiber optics 18 from the background zones 3A1 and 3A2, 4A1 or 4A2 impinges on the photo diode 96 as indicated by the waveline 98. Output voltages of the amplifiers 80 and 82 are differentially summed in the amplifier 84 having an output at a terminal 198 applied to the resistor 186 (as in FIG. 8) and coupled through a resistor 200 to the negative input terminal of the amplifier 88. The positive input terminal of the amplifier 88 is tied to ground through a resistor 202. A feedback path for the amplifier 88 includes a resistor 204 connected between the output of the amplifier and the negative input terminal. The amplifier 88 is supplied with a positive DC voltage through a resistor 206 also connected to a capacitor 208 for providing noise filtering. The amplifier 88 is also energized by a negative DC voltage connected through a resistor 210 with a capacitor 213 providing noise filtering.

An output voltage from the amplifier 88 appears at a terminal 212 and as illustrated in FIG. 6, this terminal in the circuit 71U is tied to the comparator circuit 71L.

With reference to FIG. 9, the terminal 212 (as part of the circuit 71U) is tied to a terminal 214 (as part of the circuit 71L) to apply the output of the amplifier 88 from the circuit 71U through a resistor 216 to the negative input of the amplifier 90 for the circuit 71L. Also connected to the negative input terminal of the amplifier 90 is the output of the amplifier 88 through a resistor 218. The voltage at the negative input terminal of the amplifier 90 is clamped at a preselected maximum level by a Zener diode 220. The circuitry for the amplifier 90 is essentially the same as the circuitry for the amplifier 86 of the circuit of FIG. 7 and includes potentiometers 176 and 178 in a feedback loop. The positive DC driving voltage for the amplifier 90 is provided through the resistor 164 and maintained at a level by the Zener diode 166 in parallel with a capacitor 168. The negative DC voltage for the amplifier 90 is provided through the resistor 170 and maintained at a preselected level by the Zener diode 172 in parallel with the capacitor 174. The output waveform of the amplifier 90 varies as shown by the curve 222 at an output terminal 224. The output terminal 224 for the circuit 71L is the raw data signal coupled to the logic 58.

Referring again to FIG. 6, the circuit of FIG. 9 when utilized for the circuit 70 has the background zones 3A1 and 3A2 providing light to the diode 96 and the code zone 3B reflects light to the diode 116. The output voltage of the amplifier 84 as appearing at the terminal 198, is coupled to the circuit 92 of comparator 74 as part of the input for the amplifier 94 to generate the full bar centroid high signal. The output of the amplifier 90 for the circuit 70, as appearing at the terminal 224, is the raw data signal coupled to the logic 58, FIG. 2. For the circuit 71U, light transmitted from the background zone 4A1 impinges on the diode 96, and light from the code zone 4B1 impinges on the diode 116. The output of the amplifier 84, as appearing at the terminal 198, is connected to the circuit 92 as an input to the amplifier 94 for generating the half bar centroid high signal. This voltage, at the terminal 198, is also coupled to the resistor 182 of the amplifier 184, FIG. 8 for the comparator circuit 72 of scanning zone 5. For the circuit 71U, the output of the amplifier 88, at the terminal 212, as explained, is connected to the terminal 214 of the circuit 71L. The output terminal 224 of the circuit 71U is not utilized. For the circuit 71L, light transmitted through the fiber optics 18 from the background zone 4A2 is applied to the diode 96, and light from the code zone 4B2, as transmitted by the fiber optics 18, impinges on the photo diode 116. The output of the amplifier 84 as appearing on the terminal 198, is connected to the resistor 186 of the amplifier 184, FIG. 8, for the circuit 72 covering scanning zone 5.

In one embodiment of the invention, Table 1 lists values of the components for each of the circuits of FIGS. 7, 8 and 9. It should be again emphasized that the circuit of FIG. 8 is an addition to the circuit of FIG. 7 for the comparator circuit 75, and that the circuitry for the amplifiers 80, 82 and 84 of FIG. 9 is the same as the like numbered amplifiers of FIG. 7.

TABLE 1

| Resistor | Value (Ohms) |
|---|---|
| 104, 130 | 1.0 Meg. |
| 100, 120, 124, 142, 146 | 100 |
| 164, 190, 194, 206, 210, | |
| 140, 156, 204 | 100K |

TABLE 1-Continued

| Resistor | Value (Ohms) |
|---|---|
| 114 | 47K |
| 150 | 750K |
| 152 | 1K |
| 160, 216, 218 | 4.7K |
| 170 | 330 |
| 182, 184, 188, 200, 202 | 10K |
| Potentiometers | Value (Ohms) |
| 112, 136, | 10K |
| 176 | 50K |
| 178 | 1K |
| Capacitors | Value (μ fds.) |
| 102, 122, 126, 144, 148, | 0.1 |
| 168, 174, 192, 196, 208, 212 | |
| 110, 134, 138 | 1.0 |
| 154 | 10.0 |
| Zener Diodes | Voltage (volts) |
| 162 | 6.2 |
| 166 | 12.0 |
| 172 | 6.0 |

Figure 10A:
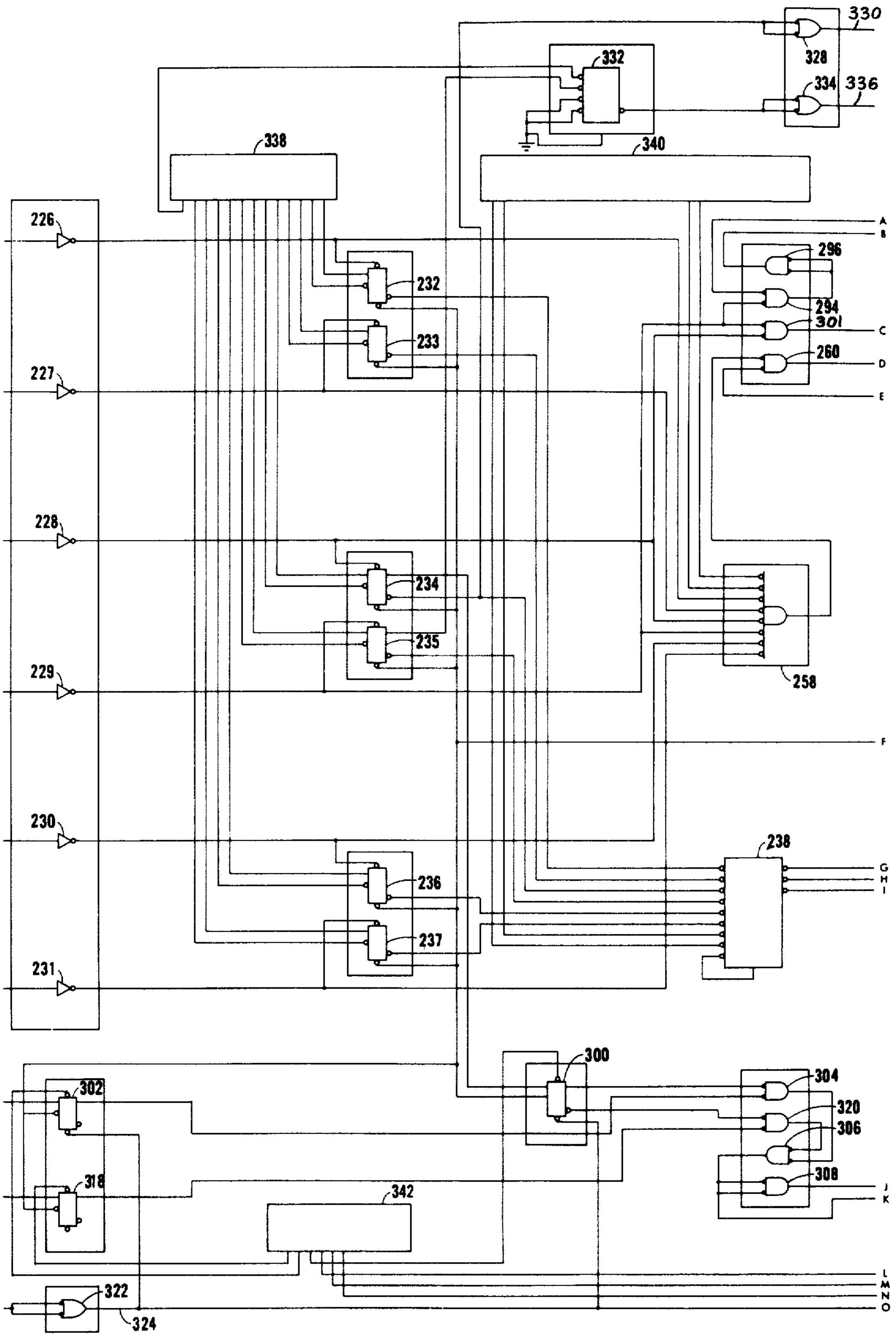
FIGS. 10A and 10B are a logic diagram of the acquisition, tracking and reading logic of FIG. 3.
Figure 10B:
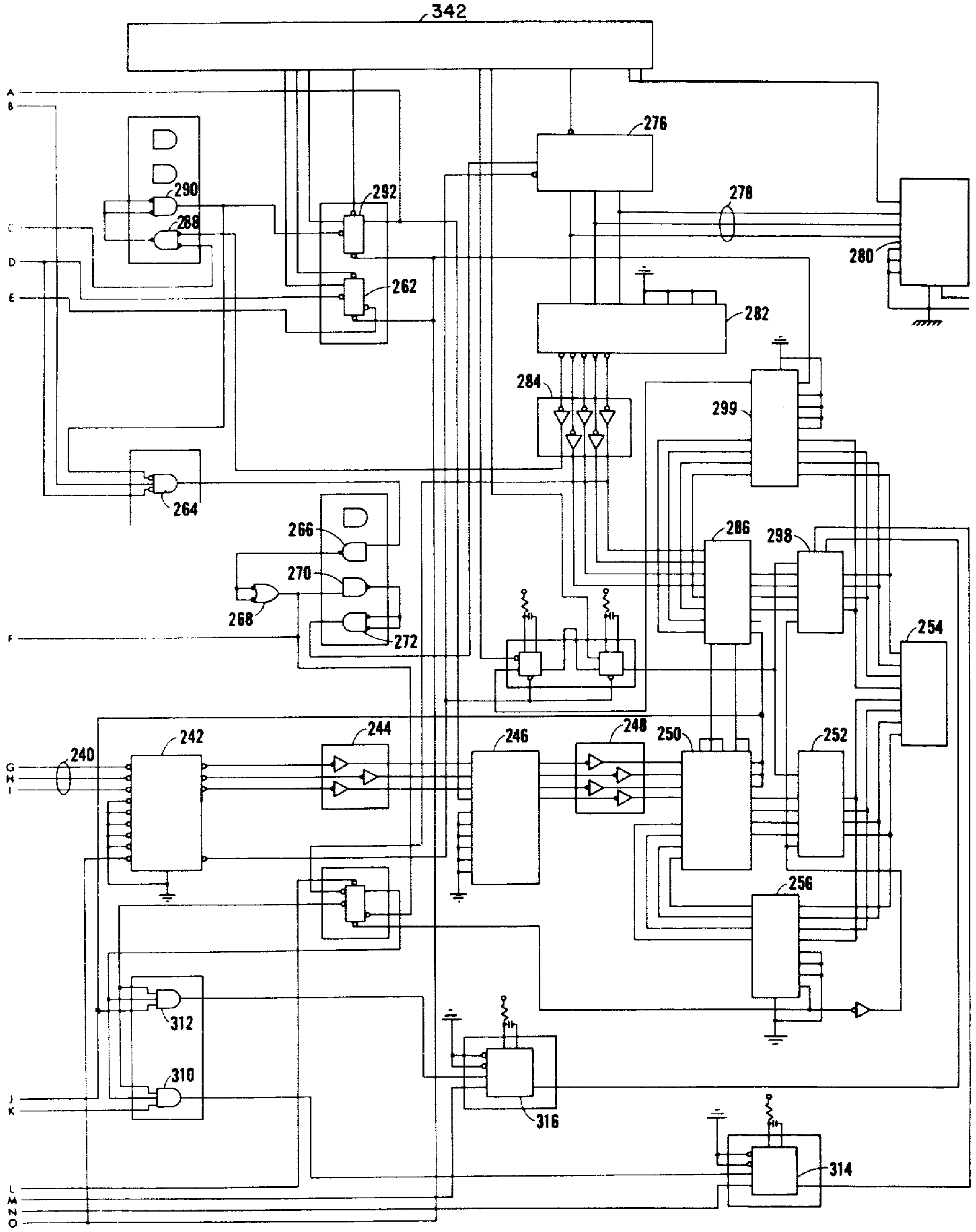

Referring to FIGS. 10A and 10B, there is shown a logic schematic for the acquisition, tracking and reading logic 58 and the deflection logic 64 including six buffer inverting amplifiers 226–231 coupled in order to the signals BZ1–BZ6 from the comparator circuits of FIG. 7. Each of the inverting amplifiers 226–231 has an output respectively coupled to flip-flops 232–237. As a bar code moves through the window area 76, one or more of the flip-flops 232–237 will be set by a change in state of the BZ signal associated with the code zone for that flip-flop. Considered as a complete code, the logic output of the flip-flops 232–237 are coupled to input terminals of a priority encoder 238 to generate a digital code on the lines 240 identifying the top most scanning zone through which the lowest portion of a bar code is passing through the window area 76. This code on the line 240 sets a quadrature latch 242 that functions as a storage of the bar code position upon resetting of the priority encoder 238. The priority encoder 238 returns to a quiescent state when resetting the flip-flops 232–237.

A code stored in the quadrature latch 242 is coupled through inverting amplifiers 244 to address a read-only-memory 246. The digital code coupled to the read-only-memory 246 addresses the various storage locations to provide a particular deflection code through inverting amplifiers 248 to a shift register 250. The shift register 250 is set and generates an output for setting a counter 252 that produces a digital output to a converter 254. The converter 254 generates an analog deflection voltage to the vertical deflection coil 38 of the image intensifier tube 10. The output of the counter 252 is also applied to a quadrature latch 256 to generate a base count for initially setting the shift register 250.

As a bar code first enters the window area 76, the flip-flops 232–237 are set and generate a signal through the priority encoder 238 related to the position of the bar code in the viewing window. This code is used to address the read-only-memory 246 that outputs a code to a register 250 to set a counter 252. The value within the counter 252 is coupled through the converter 254 to energize the deflection coils 38, thereby repositioning the window area 76 of the image intensifier tube 10 such that the bar code appears closer to the center of the window.

Depending upon the initial location of the first bar, the first correction may be insufficient to center the code in the viewing window. To provide additional vertical correction, the horizontal deflection coils of the image intensifier tube 10 are also energized to allow the first bar to again pass through the viewing window.

The output of each buffer amplifier 226–231 is connected to one input of a multiple input OR gate 258 that changes logic levels at the output whenever a bar code enters the window area 76 and returns to the original logic level after a bar has passed through the window. This last change in logic level back to the original state is utilized in the system as a clock pulse to generate a reset signal to the flip-flops 232–237. An output of the OR gate 258 couples to one input of a NAND gate 260 having an output tied to a flip-flop 262 and a NAND gate 264. The output of the NAND gate 264 is tied to one input of a NAND gate 266 having an output connected to an OR gate 268. The output of the OR gate 268 couples through a NAND gate 270 to a NAND gate 272 that generates a clock pulse on a line 274. The output of the OR gate 268 is the reset signal to the flip-flops 232–237.

Clock pulses on the line 274 set a quadrature latch 276 that produces an output code on lines 278 applied to a converter 280 having an analog output for energizing the horizontal deflection coil 38 of the image intensifier tube 10. The magnitude of the analog voltage applied to the deflection coils 38 is sufficient to position the viewing window area 76 such that the first bar code again passes through the window.

An output code provided by the latch 276 is also tied to a shift register 282 having an output coupled through inverting logic 284 to a shift register 286 as part of the vertical deflection counter system. One output of the register 282 connects to NAND gates 288 and 290 to generate a reset pulse to the clock pulse generating logic. An output of the NAND gate 290 is connected to a flip-flop 292 which has one output line tied to a NAND gate 294 in series with a NAND gate 296 coupled to the NAND gate 264.

Returning to the shift register 286, as mentioned, this is part of the vertical deflection logic and includes a counter 298 set by an output from the shift register 286. The shift register 286 and the counter 298 are coupled respectively to the shift register 250 and the counter 252 to form a composite shift register and counter. Counter 298 couples to the converter 254 to be combined with the output of the counter 252 to generate the vertical deflection voltage to the deflection coils 38. An output of the counter 298 is also tied to a quadrature latch 299 for storing a previous count to set the shift register 286 to an initial level.

On the first pass of a bar code through the window area 76, the output of the converter 254 adjusts the position of the viewing window to center the bar code, and the output of the converter 280 generates a signal to the deflection coils to horizontally shift the viewing window 76 to allow the first bar code to again pass through the viewing area of the intensifier tube 10. The initial bar code then makes another pass through the window area 76 again setting the flip-flops 232–237 to produce a code in the priority encoder 238 related to the highest zone containing the lower most portion of the bar code. This new position code again addresses the read-only-memory 246 to set the counter 252 to generate another deflection voltage to the coils 38.

During this second pass, the OR gate 258 again responds to the outputs of the amplifiers 226–231 to generate a horizontal deflection voltage from the quadrature latch 276 through the converter 280. The shift register 282 is again stepped to advance the shift register 286. Each time the shift register 282 is set after the first pass, the number set into the shift register 286 decreases on the order of 16, 8, 4, 2 and 1. In effect, this reduces the deflection voltage change generated by the converter 254 by a factor related to the number of passes the initial bar makes through the viewing window. Thus, the contribution of the counter 298 to the voltage output of the converter 254 reduces asymptotically with each pass.

Assuming that additional passes are required to center the window area 76 on the bar code, the deflection coils 38 will be energized to again vertically and horizontally move the window to allow the bar code to pass through the center thereof. Although five passes are possible with the logic system of FIGS. 10A and 10B, in practice a bar code has been centered after the second or third pass through the window.

After the window area 76 has been adjusted to pass the bar code through the reading zone, one additional horizontal deflection is made before initiating the reading sequence. With the bar code passing through the reading zone, the output of the inverting amplifier 228 and the output of the inverting amplifier 229 are connected to inputs of a NAND gate 301 in the logic chain for generating the horizontal deflection signal from the converter 280. With both inputs to the NAND gate 301 at the same logic level, the output thereof inhibits further horizontal positioning of the window area 76. This permits the code to pass through the window and each bar is then read and detected.

With the code properly oriented in the window, an output of the flip-flop 234 sets a flip-flop 300 as part of logic for continuously applying a vertical adjustment to the window area 76 to provide for any skew of the code on the document or skew of the document in the transport system 34, FIG. 2.

As a full bar code moves through the reading zone of the window 76, an output of the comparator circuit 74 sets a flip-flop 302 having an output tied to a NAND gate 304 in series with a NAND gate 306. The NAND gate 306 ties to both inputs of a NAND gate 308 and to one input of a NAND gate 310. An output of the NAND gate 308 couples to the shift registers 250 and 286 and to one input of a NAND gate 312. Depending on the output of the comparator circuit 74, either the NAND gate 310 or the NAND gate 312 generates a logic signal for controlling the vertical deflection of the window area. An output of the NAND gate 310 sets the vertical deflection when the center of the full bar code is above the center of the reading zone and must be adjusted downward. The output of the NAND gate 310 couples through delay logic 314 to the counter 298. This changes the count in the counter 298 by one count to lower the output of the converter 254 to appropriately adjust the voltage to the deflection coils 38 to adjust the position of the window area 76. If the position of the bar code is low, then the output of the NAND gate 312 generates a logic signal through a delay 316 to an input of the counter 298. This adds one count to the total in the counters 252 and 298 to change the deflection voltage at the output of the converter 254 to raise the window area 76.

As a half bar code moves through the reading zone of the window area 76, an output of the comparator 75,

FIG. 6, sets a flip-flop 318 having an output coupled to a NAND gate 320 in series with the NAND gate 306. From the NAND gate 306 the half bar code logic is the same as the full bar code logic and functions as described. Thus, for each passage of either a half bar code or a full bar code through the window area, the vertical position of the window is adjusted either up or down depending on the position of the code in the window.

At the completion of a complete bar code series passing through the window area, a signal is applied to a NOR gate 322 to generate a reset signal on a line 324 to return the system to a ready state to receive and read another bar code.

To generate a train of logic pulses relating to the full bar and half bar codes passing through the window area 76, an output of the flip-flop 234 is coupled to a NOR gate 328 to generate a change in logic levels on a line 330 for each full bar code passing through the window in the reading zone. An output of the flip-flop 235 is coupled through delay logic 332 to a NOR gate 334 having an output that changes logic levels each time a bar code, either a half bar or a full bar, passes through the window area. These timing pulses appear on an output line 336. Both the lines 330 and 336 connect to either a visual display and/or control circuitry to initiate a particular control function in response to a bar code sequence. Each time the logic level on the lines 330 and 336 change state, a full bar is passing through the window area. If only the logic level of the line 336 changes states, there is a half bar passing through the window. Thus, only a full bar produces a change in logic level on the line 330.

To maintain the correct logic levels on the various components of the system of FIGS. 10A and 10B, resistor networks 338, 340 and 342 are included in the system. Each of these blocks consists of a network of parallel resistors coupled to a voltage source for maintaining the correct voltage level on unused terminals of the various logic components. This is in accordance with standard logic circuit design.

While only one embodiment of the invention, together with modifications thereof, has been described in detail herein and shown in the accompanying drawings, it will be evident that various further modifications are possible without departing from the scope of the invention.

What is claimed is:

1. A recognition system for reading encoded data carried by an object and moving with respect to a reading station along a travel path, comprising in combination:

first means for receiving energy reflected from the encoded data to provide a first background image area from a first zone at the reading station, a code image area from a second zone at the reading station juxtapositioned the first zone, and a second background image area from a third zone at the reading station juxtapositioned the second zone;

second means for electronically deflecting energy reflected from the encoded data of the three zones at the reading station to said first means;

third means coupled to said first means and responsive to the three image areas to generate a first electrical signal related to said code image area, and a second electrical signal related to said first and second background image areas; and circuit means connected to receive said first and second electrical signals for combining said first and second electrical signals into a series of code related pulses representing the object carried encoded data.

2. A recognition system as set forth in claim 1 wherein said circuit means includes a first amplifier means connected to the first electrical signal and a second amplifier means connected to the second electrical signal.

3. A recognition system as set forth in claim 1 wherein said third means includes multiple columns of energy sensitive sensors with the center columns responsive to energy from the code image area and the outer located columns responsive to energy from the background image areas.

4. A recognition system for encoded data as set forth in claim 3 wherein said third means includes fiber optic bundles for channeling energy for each column from the image areas.

5. A recognition system as set forth in claim 1 wherein said circuit means includes first amplifier means connected to receive the first electrical signal and having an output terminals second amplifier means connected to receive the second electrical signal and having an output terminal interconnected to the output terminal of said first amplifier means, and third amplifier means having an input connected to the interconnection of the two output terminals and having an output varying as a series of voltage pulses representing the encoded data.

6. A recognition system for reading and tracking ecoded data carried by an object moving with respect to a reading station along a travel path, comprising in combination:

first means for receiving energy reflected from the encoded data to provide a first background image area from a first zone at the reading station, a code image area from a second zone at the reading station juxtapositioned the first zone, and a second background image area from a third zone at the reading station juxtapositioned the second zone;

second means for deflecting energy reflected from the encoded data at the three zones of the reading station to said first means;

third means connected to said second means to vary the magnitude of deflection imparted to the energy reflected from the three zones;

fourth means coupled to said first means and responsive to the three image areas to generate a first electrical signal related to said code image area and a second electrical signal related to said first and second background image areas;

circuit means connected to receive said first electrical signal and said second electrical signal, said circuit means being operable to combine said first and second electrical signals into a series of code related pulses representing the object carried encoded data; and fifth means to receive the code related pulses to generate a varying control voltage, said fifth means including means for applying said varying control voltage to said third means to change the deflection angle of reflected energy from the encoded data to position the image areas in said first means.

7. A recognition system as set forth in claim 6 wherein said fourth means includes multiple columns of energy sensitive sensors with the center columns responsive to energy from the code image area and generating the first electrical signal and the outer located columns responsive to energy from the background image areas to generate the second electrical signal.

8. A recognition system as set forth in claim 7 wherein said multiple columns are separated into vertical zones with one such zone selected as a read zone and the sensors of each zone generating a first signal and a second signal.

9. A recognition system as set forth in claim 8 wherein said circuit means includes a comparator circuit for each first signal of each zone and each second signal of each zone and the control voltage of said fifth means varies in accordance with a displacement from the read zone.

10. A recognition system as set forth in claim 9 wherein the control voltage of said fifth means changes the deflection angle of said second means to position the image areas in the read zone.

11. A recognition system as set forth in claim 10 wherein said first means includes an image intensifier tube providing said image areas on a phosphor screen.

12. A recognition system as set forth in claim 11 wherein said fourth means includes fiber optic bundles for each column of energy sensitive sensors.

13. A recognition system for reading and tracking encoded data carried by an object moving with respect to a reading station along a travel path, comprising in combination:

first means for receiving energy reflected from the encoded data to provide a first background image area from a first zone at the reading station, a code image area from a second zone at the reading station juxtapositioned the first zone, and a second background image area from a third zone at the reading station juxtapositioned the second zone;

second means for deflecting energy reflected from the encoded data at the three zones of the reading station to said first means, said second means including horizontal deflector means for providing deflection of the energy in a horizontal direction and vertical deflector means for positioning the energy in a vertical direction;

third means connected to said horizontal deflector means and vertical deflector means to vary the magnitude of the deflection imparted to the reflected energy in each direction;

fourth means coupled to said first means and responsive to said image areas to generate a first signal representing said code image area and a second signal representing said background image areas;

circuit means connected to receive the first signal and the second signal for summation into a series of code related pulses representing the encoded data; and fifth means connected to receive the code related pulses to generate a varying control voltage, said fifth means including means for applying said varying control voltage to said third means to change the vertical deflection angle of energy from the encoded data to position the image areas in a designated section of said first means.

14. A recognition system as set forth in claim 13 wherein said third means includes means for incrementally varying the horizontal deflection of the reflected energy in accordance with a preselected program after an initial detection of encoded data.

15. A recognition system as set forth in claim 13 wherein said fourth means includes multiple columns of energy sensitive sensors with the center columns responsive to energy from the code image area and the outer located columns responsive to the background image areas.

16. A recognition system as set forth in claim 15 wherein said multiple columns are separated into vertical zones with one such zone selected as a read zone and the sensors of each zone generating a first signal and a second signal.

17. A recognition system as set forth in claim 16 wherein said circuit means includes a comparator circuit for each first signal of each zone and each second signal of each zone, and the control voltage of said fifth means varies in accordance with the displacement from the read zone.

18. A recognition system as set forth in claim 17 wherein said fifth means includes means for generating incremental deflection voltages for the horizontal deflection of reflected energy to reposition the image areas corresponding to a particular data bit of the encoded data in the read zone.

19. A recognition system as set forth in claim 18 wherein image areas of a particular data bit are horizontally repositioned to the columns of energy sensitive sensors in accordance with a preselected program.

20. A recognition system for tracking and reading binary encoded data carried by a document moving along a track direction past a reading station, comprising in combination:

an image intensifier tube receiving energy reflected from the binary encoded data as a document moves along the track direction, said image intensifier tube providing an electron beam data reproduction of the encoded data on a phosphor screen, said electron beam data reproduction including a first background image area from a first zone at the reading station, a code image area from a second zone at the reading station juxtapositioned the first zone, and a second background image area from a third zone at the reading station juxtapositioned the second zone;

horizontal deflection coils displaced around the image intensifier tube to vary the deflection angle of the electron beam to, in turn, vary the horizontal positioning of the data reproduction on the phosphor screen;

vertical deflection coils displaced around the image intensifier tube to position the data reproduction in a vertical direction on the phosphor screen;

control means connected to the horizontal deflection coils and the vertical deflection coils to vary the position of the data reproduction in accordance with a control voltage;

light sensors coupled to the phosphor screen and responsive to the data reproduction thereon to generate a first signal representing the code image area and the second representing the first and second background image areas;

first circuit means connected to receive the first signal and the second signal for summing into a series of a code related pulses representing the binary encoded data; and second circuit means connected to receive the code related pulses to generate a varying control voltage for application to said control means to change the horizontal and vertical positioning of the data reproduction on the phosphor screen.

21. A recognition system as set forth in claim 20 including fiber optic bundles for coupling the light sensitive sensors to the phosphor screen.

22. A recognition system as set forth in claim 21 wherein said light sensitive sensors are arranged in multiple columns with the center columns responsive to light energy from the code image area and the outer located columns responsive to the background image areas.

23. A recognition system for encoded data as set forth in claim 22 wherein said multiple columns are separated into vertical zones with one such zone selected as a read zone and the light sensors of each zone generating a first signal and a second signal.

24. A recognition system as set forth in claim 23 wherein said first circuit means includes comparator circuits for each first signal and each second signal of each zone of the light sensitive sensors and the code related pulses of each such circuit varies in accordance with the displacement from the read zone.

25. A recognition system as set forth in claim 24 wherein said control means includes circuitry for applying a deflection voltage to the horizontal deflection coils to cause an incremental displacement of the data reproduction on the phosphor screen in accordance with a preselected program.

26. A recognition system as set forth in claim 23 wherein said light sensitive sensors of said read zone generate an upper data signal and a lower data signal and said first circuit means includes first amplifier means for receiving the upper data signal and a second amplifier means for receiving the lower data signal of the read zone.

27. A recognition device for reading encoded data carried by an object and moving, with respect to a reading station, along a travel path, the recognition device comprising:

means defining first, second and third juxtaposition sensing areas at the reading station for receiving energy from the encoded data;

first energy sensing means responsive to said energy at said first and third sensing areas for providing a first electrical signal;

second energy sensing means responsive to said energy at said second sensing area for providing a second electrical signal; and means for combining said first and second electrical signals to provide an output signal representative of said encoded data.

* * * * *